(12) United States Patent
Thompson

(10) Patent No.: US 6,393,410 B1
(45) Date of Patent: May 21, 2002

(54) PROCESS AND A SYSTEM FOR LISTING INFORMATION RELATING TO A CONSTRUCTION PROJECT OVER A COMPUTER NETWORK

(76) Inventor: Frederick Thompson, 4242 SW. 107$^{TH}$ Way, Davie, FL (US) 33328

( * ) Notice: Subject to any disclaimer, the term of this patent is extended or adjusted under 35 U.S.C. 154(b) by 0 days.

(21) Appl. No.: 09/570,087

(22) Filed: May 12, 2000

(51) Int. Cl.$^7$ .............................. G06F 17/60; G06G 7/00
(52) U.S. Cl. ...................................... 705/37; 707/704.1
(58) Field of Search ................... 707/1–10, 100–104.1, 707/200–206, 500–542, 104; 705/1–45, 80, 400–412

(56) References Cited

U.S. PATENT DOCUMENTS

| | | | | |
|---|---|---|---|---|
| 4,578,768 A | * | 3/1986 | Racine ........................ | 364/560 |
| 4,791,561 A | * | 12/1988 | Huber ........................... | 707/1 |
| 4,845,625 A | * | 7/1989 | Stannard ...................... | 364/407 |
| 5,189,606 A | * | 2/1993 | Burns et al. ................. | 364/401 |
| 5,526,520 A | * | 6/1996 | Krause ........................ | 707/104.1 |
| 5,625,827 A | * | 4/1997 | Krause et al. ............... | 345/964 |
| 5,689,705 A | * | 11/1997 | Fino et al. ..................... | 707/10 |
| 5,761,674 A | * | 6/1998 | Ito ............................ | 707/104.1 |
| 5,794,219 A | * | 8/1998 | Brown ......................... | 705/37 |
| 5,890,138 A | * | 3/1999 | Godin et al. .................. | 705/26 |
| 5,893,082 A | * | 4/1999 | McCormick ................ | 345/788 |
| 5,905,975 A | * | 5/1999 | Ausubel ....................... | 705/37 |
| 5,907,850 A | * | 5/1999 | Krause et al. .............. | 345/854 |
| 5,918,219 A | * | 6/1999 | Isherwood ................... | 235/378 |
| 5,950,206 A | * | 9/1999 | Krause ........................ | 707/104 |
| 6,021,398 A | * | 2/2000 | Ausubel ....................... | 705/37 |
| 6,038,547 A | * | 3/2000 | Casto .......................... | 705/30 |
| 6,047,274 A | * | 4/2000 | Johnson et al. ............. | 705/412 |
| 6,151,589 A | * | 11/2000 | Aggarwal et al. ............ | 705/37 |
| 6,161,099 A | * | 12/2000 | Harrington et al. ........... | 705/37 |
| 6,199,050 B1 | * | 3/2001 | Alaia et al. .................... | 705/37 |
| 6,202,051 B1 | * | 3/2001 | Woolston ..................... | 705/27 |

* cited by examiner

Primary Examiner—John Breene
Assistant Examiner—Linh Pham
(74) Attorney, Agent, or Firm—Collard & Roe, P.C.

(57) ABSTRACT

The invention relates to a process for estimating a construction project over a computer network. The first step in the process starts when an architect or contractor enters information relating to at least one construction project into an online database. This online database is stored on a server creating a series of quantities for each of the at least one construction projects. Next, a system host presents a series of quantities for each of the at least one construction projects. Next, users such as contractors, subcontractors or construction managers can purchase and download these quantities and a construction report. These quantities are presented in a unique electronic spreadsheet template. Once the users have this template with the quantities included, they can bid on each construction project either online or through any other communication means.

15 Claims, 20 Drawing Sheets

Add/Remove Project

Select Project Name to Delete

[dropdown]

[Delete]

Enter/Edit Project

Project Name:
[text field]

Address1:
[text field]

Address2:
[text field]

City:
[text field]

State:
[AK ▼]

Zip:
[text field]

[Submit] [Reset]

Engineer's Estimated Cost:
[text field]

Bid Due Date:
[text field]

GC's Estimated Project Start Date:
[text field]

Project Contract Number:
[text field]

Project Sq. Foot:
[text field]

Project Description:
[text area]

*FIG. 4*

Project Update

Select Project Name
[ ▽ ]

Select Parent Division Name (if applicable)
[ ▽ ] [ Delete Parent ]

Enter Division Number - Name
[        ] - [              ]

Parent Division Cost Override (if applicable)
[            ]

Project Square Foot:
[ 20000 ]

Select Download Association:
[ 1-Estimates   ▽ ]

Enter Child Division File Name:
[                      ]

Enter Child Division File Description:
[            ]

[ Add\Edit ] [ Delete ]

FIG. 6

Create Account

User ID

Password

[ Logon ]

Estimates

Quantity Survey

Project Schedules

Select State:

Select Location:

Select Project:

[ Submit ]

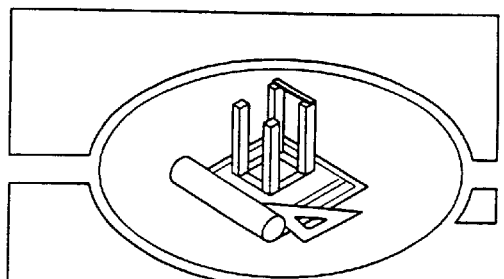

Create Account

User ID
[          ]

Password
[          ]

[ Logon ]

Estimates

Quantity Survey

Project Schedules

Your selected project
Select Division(s) to download:
Project Name:Washington_Heights Views
Washington_Heights, NY 10568
Contract Number:SWH001
Description:New apartment complex
Bid Due Date:2/5/2000

1-GENERAL CONDITIONS
☐ 01910-Permits & Fees             $30.00
☐ 01920-Temporary Protection       $30.00
☐ 01930-Field Offices              $30.00
☐ 01940-Field Offices Furniture    $30.00
☐ 01950-Sidewalk Bridge            $30.00
☐ 01960-Life Safety Signs          $30.00
☐ 01970-Project Signage            $30.00
☐ 01980-Security                   $30.00

2-SITEWORK
☐ 02000-Shoring                    $50.00
☐ 02001-Excavation                 $50.00
☐ 02003-Haulage                    $50.00

15-MECHANICAL
☐ 1500-HVAC                        $140.00
☐ 15000-HVAC                       $30.00
☐ 1502-Plumbing                    $30.00
☐ 152001-Plumbing                  $30.00
☐ 152233-Plumbing Piping           $30.00

16- ELECTRICAL
☐ 16020-Fire                       $46.00
☐ 16021-Controls                   $46.00
☐ 16030-Alarm                      $46.00

*FIG. 8*

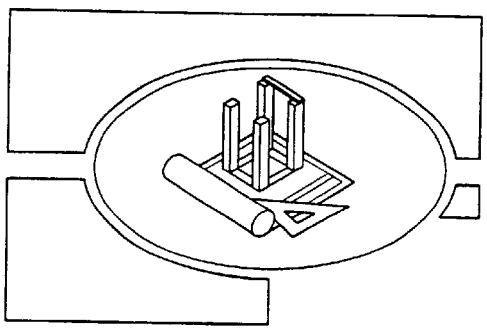

Create Account
User ID
Password

Logon

Estimates

Quantity Survey

Project Schedules

Administration

Add/Delete Project

Project Update

File Upload

Customer Information

Company Name:
Address1:
Address2:
City:
State:
Zip:
Telephone:
Fax:
User First Name:
User Last Name:
E-mail Address:
User ID:
Password:
Confirm Password:

Provide a phrase in the event that you forget your password.
Password phrase:
Card Owner  ⦿ Company  ○ User
Card Number:
Expiration Date:
Card Type: AMEX Submit  Reset

FIG. 9

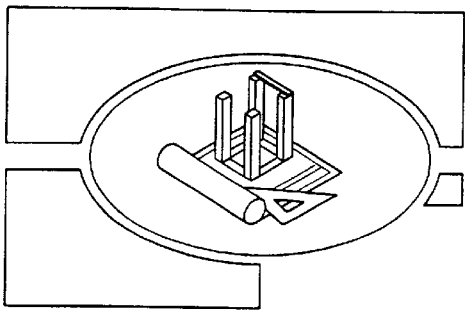

Create Account
User ID
[          ]
Password
[          ]

[ Logon ]

Estimates

Quantity Survey

Project Schedules

Administration

Cost Update

Add/Delete Project

Project Update

File Upload

Cost Update:

Project name: [Washington_Heights Views ▽]
(a) Project square foot: [20000]
Project Service ID: [▽]
Division name: HVAC (b) Cost / Sq. foot: [0.00000]   Division cost (a x b) [0.00]

Division name: GENERAL CONDITIONS (b) Cost / Sq. foot: [0.00150]   Division cost (a x b) [30.00]

Division name: SITEWORK (b) Cost / Sq. foot: [0.00250]   Division cost (a x b) [50.00]

Division name: MECHANICAL (b) Cost / Sq. foot: [0.00150]   Division cost (a x b) [30.00]

Division name: ELECTRICAL (b) Cost / Sq. foot: [0.00230]   Division cost (a x b) [46.00]

Project total cost:
[156]

[ Update ]

| Div | 10,000 Project Avg. Size Trade Description | Avg. Cost Per Item | Cost Per Div | Projected Sales/Div | Total Sales Per Div |
|---|---|---|---|---|---|
| 1 | GENERAL CONDITIONS | | $150.00 | 3 | $450.00 |
| | 01910 Permits & Fees | $25.00 | | | |
| | 01920 Temporary Protection | $35.00 | | | |
| | 01930 Field Offices | $10.00 | | | |
| | 01940 Field Offices Furniture | $25.00 | | | |
| | 01950 Sidewalk Bridge | $25.00 | | | |
| | 01960 Life Safety Signs | $10.00 | | | |
| | 01970 Project Signage | $10.00 | | | |
| | 01980 Security | $10.00 | | | |
| 2 | 02000 SITEWORK | | $1,130.00 | 3 | $3,390.00 |
| | 02150 shoring & underpinning | $50.00 | | | |
| | 02164 soil & rock anchors | $50.00 | | | |
| | 02246 geotextiles / geomatrixes | $25.00 | | | |
| | 02270 slope protection & erosion control | $25.00 | | | |
| | 02276 earth retainage | $50.00 | | | |
| | 02280 soil treatment | $20.00 | | | |
| | 02480 marine work | $50.00 | | | |
| | 02515 unit pavers & accessories | $25.00 | | | |
| | 02520 concrete paving | $25.00 | | | |
| | 02524 porous paving | $25.00 | | | |
| | 02525 curbing | $25.00 | | | |
| | 02535 athletic & playground surfacing | $20.00 | | | |
| | 02540 synthetic surfacing | $20.00 | | | |
| | 02710 subsurface drainage materials | $50.00 | | | |
| | 02712 subsurface drainage pipe | $50.00 | | | |
| | 02722 drains & inlets | $50.00 | | | |
| | 02725 precast trench drain system | $50.00 | | | |
| | 02800 site improvements | $50.00 | | | |
| | 02820 fountains, pools & water displays | $25.00 | | | |
| | 02830 fences & gates | $25.00 | | | |
| | 02835 gate operators | $25.00 | | | |
| | 02840 walk, road & parking appurtenances | $50.00 | | | |
| | 02842 bicycle racks/ lockers | $20.00 | | | |
| | 02853 highway sign posts | $50.00 | | | |
| | 02860 recreational facility & playground | $25.00 | | | |
| | 02870 site, street & mall furnishings | $25.00 | | | |
| | 02872 street, mall docks, bells & carillons | $25.00 | | | |
| | 02875 site and street shelters | $75.00 | | | |
| | 02880 outdoor sculpture & ornamental work | $25.00 | | | |
| | 02890 bridges-pedestrian, vehicular | $50.00 | | | |
| | 02980 landscape accessories | $50.00 | | | |

FIG. 13

| 2 | 03000 | CONCRETE | $385.00 | 3 | $1,155.00 |
|---|---|---|---|---|---|
| | 03010 | concrete materials | $25.00 | | |
| | 03100 | concrete formwork | $25.00 | | |
| | 03125 | formliners | $25.00 | | |
| | 03200 | concrete reinforcement | $50.00 | | |
| | 03250 | concrete accessories | $20.00 | | |
| | 03346 | concrete crack control equipment | $25.00 | | |
| | 03404 | precast autoclaved aerated concrete wall roof p | $50.00 | | |
| | 03412 | precast, insulated foundation wall systems | $50.00 | | |
| | 03450 | architectural precast concrete | $50.00 | | |
| | 03500 | cementitious decks | $20.00 | | |
| | 03650 | cementitious underlayment | $20.00 | | |
| | 03700 | concrete restoration & cleaning | $25.00 | | |

| 4 | 04000 | MASONRY | $475.00 | 3 | $1,425.00 |
|---|---|---|---|---|---|
| | 04100 | mortar & masonry grout | $25.00 | | |
| | 04150 | masonry reinforcing & accessories | $25.00 | | |
| | 04200 | unit masonry | $50.00 | | |
| | 04225 | precast autoclaves aerated concrete masonry ur | $25.00 | | |
| | 04235 | preassembled masonry panels | $25.00 | | |
| | 04242 | masonry wall systems | $25.00 | | |
| | 04245 | veneer masonry systems | $25.00 | | |
| | 04270 | glass unit masonry | $25.00 | | |
| | 04400 | stone | $25.00 | | |
| | 04455 | marble | $25.00 | | |
| | 04460 | limestone | $25.00 | | |
| | 04465 | granite | $25.00 | | |
| | 04475 | slate | $25.00 | | |
| | 04480 | reconstructed stone | $25.00 | | |
| | 04500 | masonry restoration & cleaning | $25.00 | | |
| | 04555 | flue liners | $25.00 | | |
| | 04710 | simulated / manufactured stone | $25.00 | | |
| | 04720 | cast stone | $25.00 | | |

| 5 | 05000 | METALS | $700.00 | 3 | $2,100.00 |
|---|---|---|---|---|---|
| | 05010 | metal materials | $50.00 | | |
| | 05030 | metal coatings | $50.00 | | |
| | 05050 | metal fastening | $50.00 | | |
| | 05100 | structural metal framing | $75.00 | | |
| | 05160 | structural framing systems | $75.00 | | |
| | 05300 | metal decking | $25.00 | | |
| | 05400 | cold-formed metal framing | $50.00 | | |
| | 05515 | ladders & rungs | $25.00 | | |
| | 05532 | gratings, trench covers | $25.00 | | |
| | 05535 | floor plates | $25.00 | | |
| | 05540 | castings | $25.00 | | |
| | 05600 | architectural metalwork | $75.00 | | |
| | 05712 | straight run stairs | $25.00 | | |
| | 05715 | spiral & circular stairs | $50.00 | | |
| | 05720 | railings & handrails | $25.00 | | |
| | 05723 | treads & nosings | $25.00 | | |
| | 05800 | expansion control | $25.00 | | |

FIG. 14

| 6 | 06000 | WOOD AND PLASTICS | $665.00 | 3 | $1,995.00 |
|---|---|---|---|---|---|
| | 06010 | lumber | $75.00 | | |
| | 06060 | connectors & supports | $25.00 | | |
| | 06124 | fiberboard sheets & decking | $25.00 | | |
| | 06170 | prefabricated structural wood | $75.00 | | |
| | 06180 | glued laminated timber | $50.00 | | |
| | 06182 | glued laminated decking | $25.00 | | |
| | 16190 | prefabricated wood joints & trusses | $75.00 | | |
| | 16240 | laminates | $25.00 | | |
| | 06300 | wood treatment | $20.00 | | |
| | 06310 | wood coatings | $20.00 | | |
| | 06400 | architectural woodwork | $75.00 | | |
| | 06412 | cabinet & drawer hardware | $25.00 | | |
| | 06482 | wood veneers & flitches | $25.00 | | |
| | 06600 | plastic fabrications | $75.00 | | |
| | 06610 | glass fiber & resin fabrications | $25.00 | | |
| | 06650 | solid polymer fabrications | $25.00 | | |
| 7 | 07000 | THERMAL AND MOISTURE PROTECTION | $780.00 | 3 | $2,340.00 |
| | 07100 | waterproofing & dampproofing | $25.00 | | |
| | 07180 | water repellants | $25.00 | | |
| | 07190 | vapor retarders | $25.00 | | |
| | 07200 | insulation | $25.00 | | |
| | 07220 | roof & deck insulation | $25.00 | | |
| | 07240 | exterior insulation & finish systems | $50.00 | | |
| | 07250 | fireproofing | $25.00 | | |
| | 07270 | firestopping | $25.00 | | |
| | 07280 | smoke containment barriers | $25.00 | | |
| | 07310 | shingles | $50.00 | | |
| | 07320 | roofing tiles | $50.00 | | |
| | 07325 | roofing tile fastening accessories | $25.00 | | |
| | 07410 | roof & wall panels | $25.00 | | |
| | 07420 | wall panels | $25.00 | | |
| | 07460 | siding | $25.00 | | |
| | 07500 | membrane roofing | $25.00 | | |
| | 07555 | roof ballast materials | $25.00 | | |
| | 07560 | roof maintenance / repair | $25.00 | | |
| | 07570 | traffic topping | $20.00 | | |
| | 07610 | metal roofing | $25.00 | | |
| | 07620 | sheet metal flashing & trim | $25.00 | | |
| | 07650 | flexible flashing | $25.00 | | |
| | 07710 | prefabricated roof specialties | $25.00 | | |
| | 07715 | fascias, soffit panels & penthouse enclosures | $35.00 | | |
| | 07720 | roof accessories | $20.00 | | |
| | 07810 | unit skylights | $20.00 | | |
| | 07820 | skylight structures | $35.00 | | |
| | 07920 | sealants, caulking & seals | $25.00 | | |

*FIG. 15*

| 8 | 08000 | DOORS & WINDOWS | $1,285.00 | 3 | $3,855.00 |

| | | | |
|---|---|---|---|
| | 08100 | metal doors & frames | $25.00 |
| | 08200 | wood & plastic doors & frames | $25.00 |
| | 08250 | door opening assemblies | $25.00 |
| | 08275 | door louvers & vision lights | $25.00 |
| | 08300 | special doors | $25.00 |
| | 08305 | access doors | $25.00 |
| | 08315 | blast-resistant doors | $25.00 |
| | 0831B | air & watertight doors | $25.00 |
| | 08330 | coiling doors & grilles | $25.00 |
| | 08350 | folding doors & grilles | $25.00 |
| | 08352 | folding fire barriers | $25.00 |
| | 083B0 | upward-acting sectional doors | $25.00 |
| | 08370 | industrial & hangar doors | $25.00 |
| | 08375 | hangar doors | $50.00 |
| | 08380 | traffic / impact doors | $50.00 |
| | 08382 | darkroom doors | $25.00 |
| | 08385 | sound control doors | $25.00 |
| | 08400 | entrances & storefronts | $75.00 |
| | 08455 | fire-rated glazed wall / door assemblies | $75.00 |
| | 08460 | automatic entrance doors | $50.00 |
| | 08464 | automatic sliding circular entrance doors | $50.00 |
| | 08470 | revolving entrance doors | $50.00 |
| | 08500 | metal windows | $35.00 |
| | 08B10 | wood windows | $35.00 |
| | 08B30 | vinyl windows | $25.00 |
| | 08640 | glazed patio doors | $25.00 |
| | 08B53 | sound control doors | $25.00 |
| | 08660 | detention / security windows & screens | $50.00 |
| | 08665 | pass & observation windows | $50.00 |
| | 086B7 | exterior roll-up window shutters | $25.00 |
| | 08BB8 | exterior folding, sliding shutters | $25.00 |
| | 08710 | finish hardware | $50.00 |
| | 08716 | exit devices | $10.00 |
| | 08718 | sliding & folding door hardware | $10.00 |
| | 08720 | door operators | $10.00 |
| | 08722 | automatic door sensors | $10.00 |
| | 08730 | weather-stripping & thresholds | $10.00 |
| | 08760 | window hardware & specialties | $10.00 |
| | 08810 | glass | $10.00 |
| | 08820 | decorative glazing | $20.00 |
| | 08840 | plastic glazing | $20.00 |
| | 08850 | glazing accessories | $10.00 |
| | 08870 | glazing film | $10.00 |
| | 08900 | glazed curtain walls | $25.00 |

*FIG. 16*

| 9 | 09000 | FINISHES | $385.00 | 3 | $1,155.00 |
|---|---|---|---|---|---|
| | 09120 | ceiling suspension systems | $25.00 | | |
| | 09200 | lath & plaster | $25.00 | | |
| | 09250 | gypsum board | $35.00 | | |
| | 09290 | gypsum fabrications | $25.00 | | |
| | 09300 | tile | $25.00 | | |
| | 09390 | tile setting materials & accessories | $25.00 | | |
| | 08400 | terrazzo-poured, precast | $20.00 | | |
| | 09500 | acoustical treatment | $25.00 | | |
| | 09545 | special ceiling surfaces | $25.00 | | |
| | 09550 | wood flooring | $25.00 | | |
| | 09600 | stone flooring | $25.00 | | |
| | 09650 | resilient flooring | $20.00 | | |
| | 09700 | special flooring | $25.00 | | |
| | 09770 | athletic surfacing- Indoor | $25.00 | | |
| | 09782 | detectable / tactile warning surfaces | $25.00 | | |
| | 09795 | flooring underlayment | $10.00 | | |
| 10 | 10000 | SPECIALTIES | $745.00 | 3 | $2,235.00 |
| | 10110 | chalkboards & tackboards | $10.00 | | |
| | 10155 | toilet compartments | $25.00 | | |
| | 10190 | hospital cubicles | $25.00 | | |
| | 10200 | louvers & vents | $10.00 | | |
| | 10Z35 | brick & block vents | $10.00 | | |
| | 10240 | grilles, & screens | $10.00 | | |
| | 10250 | service wall units | $25.00 | | |
| | 10260 | wall and corner guards | $25.00 | | |
| | 10270 | access floors | $25.00 | | |
| | 10290 | pest control | $25.00 | | |
| | 10300 | fireplaces & stoves | $25.00 | | |
| | 10350 | flagpoles | $10.00 | | |
| | 10405 | banners & flags | $10.00 | | |
| | 10410 | directories & bulletin boards | $10.00 | | |
| | 10416 | computerized directories & message boards | $20.00 | | |
| | 10420 | letters & plaques | $25.00 | | |
| | 10426 | signage & graphics | $25.00 | | |
| | 10450 | pedestrian control devices | $25.00 | | |
| | 10500 | lockers | $25.00 | | |
| | 10501 | locker accessories & locks | $25.00 | | |
| | 10512 | tenant storage compartments | $25.00 | | |
| | 10520 | fire protection specialties | $25.00 | | |
| | 10530 | protective covers | $25.00 | | |
| | 10536 | awnings | $25.00 | | |
| | 10550 | postal specialties | $25.00 | | |
| | 10605 | wire mesh partitions | $25.00 | | |
| | 10615 | demountable partitions | $25.00 | | |
| | 10650 | operable partitions | $25.00 | | |
| | 10670 | storage shelving | $25.00 | | |
| | 10700 | exterior sun control devices | $25.00 | | |
| | 10750 | telephone specialties | $10.00 | | |
| | 10800 | toilet & bath accessories | $25.00 | | |
| | 10820 | tub & shower doors / enclosures | $15.00 | | |
| | 10900 | wardrobe & closet specialties | $15.00 | | |
| | 10914 | hat & coat racks & accessories | $15.00 | | |
| | 10916 | closet specialties | $25.00 | | |

*FIG. 17*

| 11 | 11000 | EQUIPMENT | $850.00 | 3 | $2,550.00 |

| | | |
|---|---|---|
| 11014 | window washing and building facade maintenance | $50.00 |
| 11030 | bank equipment | $25.00 |
| 11040 | ecclesiastical equipment | $50.00 |
| 11050 | library equipment | $25.00 |
| 11060 | theater & stage equipment | $25.00 |
| 11090 | checkroom equipment | $25.00 |
| 11100 | merchandising / display equipment | $25.00 |
| 11110 | laundry & dry cleaning equipment | $25.00 |
| 11130 | audio-visual equipment | $25.00 |
| 11132 | projection screens | $25.00 |
| 11133 | motorized projection screencover & carriers | $25.00 |
| 11146 | vehicle lubrication equipment | $25.00 |
| 11150 | parking control equipment | $25.00 |
| 11160 | loading dock equipment | $25.00 |
| 11171 | incinerators | $25.00 |
| 11172 | waste compactors & destructors | $25.00 |
| 11175 | waste chutes & collectors | $25.00 |
| 11190 | detention equipment | $25.00 |
| 11400 | food service equipment | $25.00 |
| 11406 | walk-in coolers & freezers | $25.00 |
| 11452 | residential appliances | $25.00 |
| 11455 | kitchen and bath cabinets | $25.00 |
| 11457 | television units & accessories | $25.00 |
| 11458 | disappearing stairs | $25.00 |
| 11460 | unit kitchens | $25.00 |
| 11470 | photo & graphic arts equipment | $25.00 |
| 11480 | athletic, recreational, and therapeutic equipment | $25.00 |
| 11496 | shooting range equipment | $25.00 |
| 11528 | paint spray booths | $25.00 |
| 11700 | medical & hospital equipment | $25.00 |
| 11780 | mortuary equipment | $25.00 |

FIG. 18

| 12 | 12000 | FURNISHING | $350.00 | 3 | $1,050.00 |
|---|---|---|---|---|---|
| | 12300 | manufactured casework | $25.00 | | |
| | 12345 | laboratory casework | $25.00 | | |
| | 12350 | medical casework | $25.00 | | |
| | 12505 | blinds, shades & shutters | $25.00 | | |
| | 12530 | drapery & curtain hardware | $25.00 | | |
| | 12535 | motorized hardware-blinds shades draperies | $25.00 | | |
| | 12624 | restaurant/bar furniture | $25.00 | | |
| | 1262B | mailroom furniture | $25.00 | | |
| | 12628 | computer / communications furniture & accessories | $25.00 | | |
| | 12B39 | folding wall furniture | $25.00 | | |
| | 12B90 | floor mats & frames | $25.00 | | |
| | 12710 | auditorium arena & theater seating | $25.00 | | |
| | 12745 | built-in table / seating | $25.00 | | |
| | 12750 | multiple-use fixed seating | $25.00 | | |
| 13 | 13000 | SPECIAL CONSTRUCTION | $725.00 | 3 | $2,175.00 |
| | 13015 | cable-supported & fabric structure | $25.00 | | |
| | 13028 | interior framing assemblies | $25.00 | | |
| | 13032 | athletic rooms | $25.00 | | |
| | 13034 | sound-conditioned rooms | $25.00 | | |
| | 13036 | precision controlled environments | $25.00 | | |
| | 13038 | cold storage rooms & buildings | $25.00 | | |
| | 13039 | wine storage rooms | $25.00 | | |
| | 13046 | shelters & booths | $25.00 | | |
| | 13052 | saunas & equipment | $25.00 | | |
| | 13054 | steam baths & equipment | $25.00 | | |
| | 13070 | bullet-resistant protection | $25.00 | | |
| | 13074 | pressure relief panel assemblies | $25.00 | | |
| | 13080 | sound & vibration control | $25.00 | | |
| | 13090 | radiation protection | $25.00 | | |
| | 13095 | radio frequency-shielded enclosures | $25.00 | | |
| | 13122 | metal building systems | $25.00 | | |
| | 13123 | glazed structures | $25.00 | | |
| | 13125 | grandstands & bleachers | $25.00 | | |
| | 13123 | fire training structures | $25.00 | | |
| | 13132 | dome structures | $25.00 | | |
| | 13145 | mezzanine systems | $25.00 | | |
| | 13146 | equipment / storage enclosures | $25.00 | | |
| | 13149 | swimming pool enclosures | $25.00 | | |
| | 13152 | swimming pools & equipment | $25.00 | | |
| | 13170 | whirlpool spas & hot tubs | $25.00 | | |
| | 13185 | kennels & animal shelters | $25.00 | | |
| | 13200 | liquid & gas storage tanks 8 basins | $25.00 | | |
| | 13600 | solar energy systems | $25.00 | | |
| | 13800 | building automation systems | $25.00 | | |

FIG. 19

| 14 | 14000 | CONVEYING SYSTEMS | $350.00 | 3 | $1,050.00 |
|---|---|---|---|---|---|
| | 14100 | dumbwaiters | $25.00 | | |
| | 14200 | elevators | $25.00 | | |
| | 14205 | passenger cabs | $25.00 | | |
| | 14235 | residential elevators | $25.00 | | |
| | 14320 | moving walks | $25.00 | | |
| | 14420 | wheelchair lifts | $25.00 | | |
| | 14425 | stair lifts | $25.00 | | |
| | 14450 | vehicle lifts | $25.00 | | |
| | 14460 | material handling lifts | $25.00 | | |
| | 14500 | material handling systems | $25.00 | | |
| | 14555 | vertical reciprocating conveyors | $25.00 | | |
| | 14580 | pneumatic tube systems | $25.00 | | |
| | 14700 | turntables | $25.00 | | |
| | 14930 | funiculars | $25.00 | | |
| 15 | 15000 | MECHANICAL | $350.00 | 3 | $1,050.00 |
| | 15250 | mechanical insulation | $25.00 | | |
| | 15320 | fire protection sprinkler systems | $25.00 | | |
| | 15440 | plumbing fixtures | $25.00 | | |
| | 15445 | fittings, trim & accessories | $25.00 | | |
| | 15455 | water coolers & drinking, fountains | $25.00 | | |
| | 15500 | heating, ventilating & air conditioning | $25.00 | | |
| | 15555 | boilers & water heaters | $25.00 | | |
| | 15620 | fuel-fired heaters | $25.00 | | |
| | 15835 | convectors & radiators | $25.00 | | |
| | 15840 | radiant heating systems | $25.00 | | |
| | 15875 | air curtain units | $25.00 | | |
| | 15877 | fume exhaust equipment | $25.00 | | |
| | 15890 | ductwork | $25.00 | | |
| | 15942 | registers, grilles & diffusers | $25.00 | | |
| 16 | 16000 | ELECTRICAL | $625.00 | 3 | $1,875.00 |
| | 16110 | raceways, conduits & trenches | $50.00 | | |
| | 16128 | undercarpet cabling systems | $50.00 | | |
| | 16500 | lighting | $35.00 | | |
| | 16503 | poles, posts & standards | $35.00 | | |
| | 16504 | ballasts | $25.00 | | |
| | 16505 | lenses, louvers, reflectors & accessories | $25.00 | | |
| | 16510 | interior luminaries | $35.00 | | |
| | 16520 | exterior luminaries | $35.00 | | |
| | 16535 | emergency lighting | $35.00 | | |
| | 16670 | lighting protection | $50.00 | | |
| | 16720 | building security equipment-alarm, detection, ac | $50.00 | | |
| | 16734 | score boards | $35.00 | | |
| | 16855 | electric heating cables & mats | $25.00 | | |
| | 16880 | electric radiant heaters | $65.00 | | |
| | 16915 | lighting control equipment | $75.00 | | |

*FIG. 20*

PROCESS AND A SYSTEM FOR LISTING INFORMATION RELATING TO A CONSTRUCTION PROJECT OVER A COMPUTER NETWORK

BACKGROUND OF THE INVENTION

Field of the Invention

The invention relates to a process and a system for listing information relating to a construction project over a computer network. More specifically, the invention relates to a process and a system for presenting quantities, estimates, bids, project schedules, and shop drawings relating to construction projects over a computer network.

SUMMARY OF THE INVENTION

The invention relates to a process and a system for displaying quantities, estimates, bids, project schedules and shop drawings for a construction project over a computer network. The quantities and estimates, are created through an electronic spreadsheet engine while the shop drawings are stored as a digitized drawing. The first step in the process starts when an architect or contractor prepares construction documents that are conceptual or working documents. The information is then transformed into a detailed list of quantities ready for pricing in an electronic spreadsheet format. This information is then stored in an online database. This online database is stored on a server that is connected to remote computers over the computer network. When the system host enters this information the system host creates a series of quantities for each of the construction projects. Next, the system host presents these quantities for each of the construction projects on a web-page over the computer network. Next, users such as contractors, subcontractors or construction managers can purchase and download these quantities and a construction report. Once the users have these quantities they can bid on each construction project either online or through any other communication means.

To further simplify this process, each construction project is sorted in the database by location so that when users log into the database, they can choose construction projects based upon their location.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings wherein similar reference characters denote similar elements throughout the several views:

FIG. 4 is a copy of an add/remove project web-page for adding or removing projects to the database;

FIG. 6 is a copy of a project update web-page for revising projects already entered into the database;

FIG. 8 is a copy of a quantities listing web-page wherein a user can select the particular quantities to purchase;

FIG. 9 is a copy of a customer information web-page for entering in the name and information of a user who might want to purchase a listing of quantities for a project;

FIG. 10 is a copy of a cost update web-page that allows an administrator to update the cost to download quantities for each division or specification section;

FIG. 11 is a first embodiment of a selection page for selecting quantities or estimates;

Figure 12:
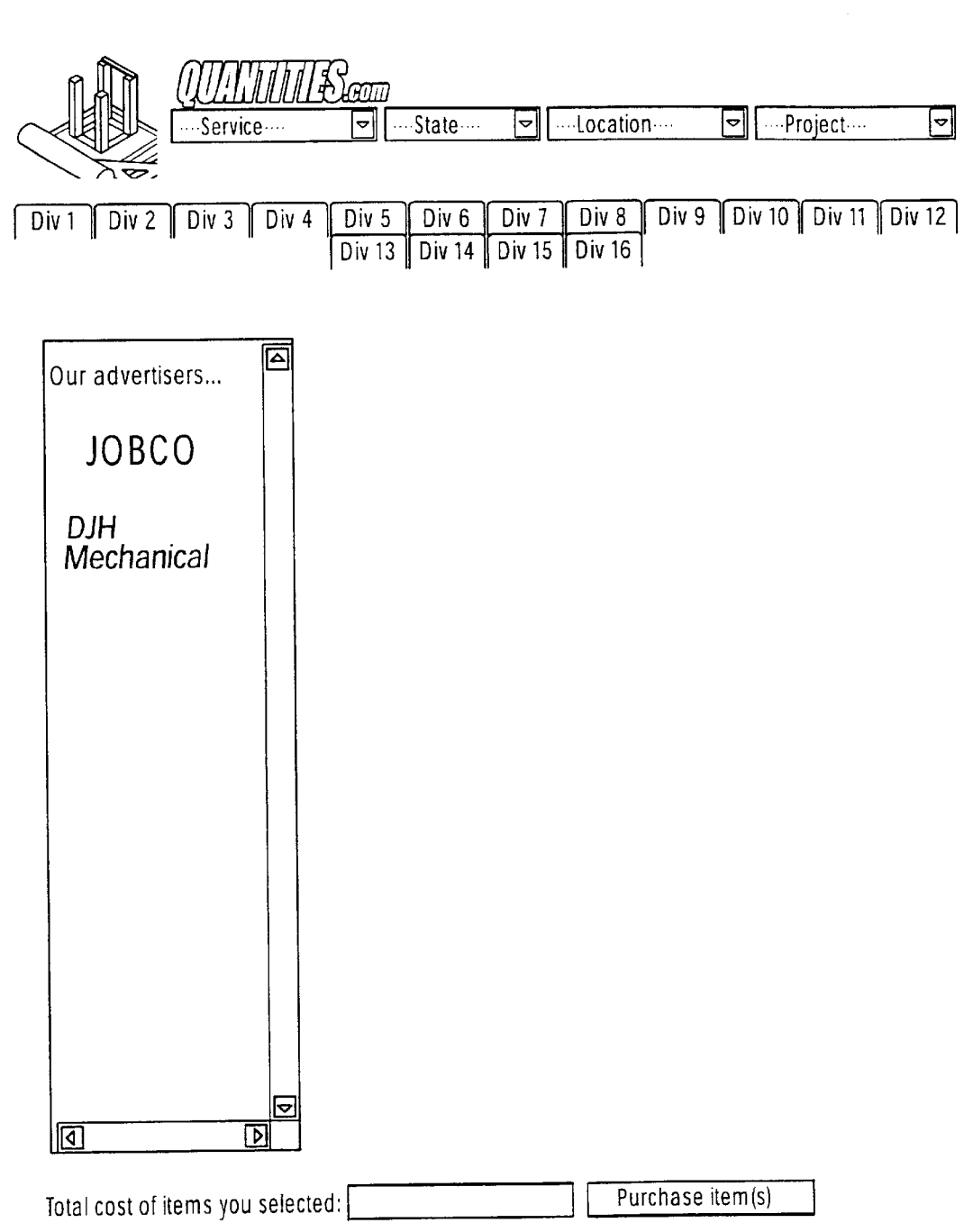

FIG. 12 is a second embodiment of a selection page for selecting a project quantity or estimate listing;

FIG. 13 is a copy of a first web-page detailing a project quantity or estimate listing;

FIG. 14 is a copy of a second web-page detailing the project quantity or estimate listing;

FIG. 15 is a copy of a third web-page detailing the project quantity or estimate listing;

FIG. 16 is a copy of a fourth web-page detailing the project quantity or estimate listing;

FIG. 17 is a copy of a fifth web-page detailing the project quantity or estimate listing;

FIG. 18 is a copy of a sixth web-page detailing the project quantity or estimate listing;

FIG. 19 is a copy of a seventh web-page detailing the project quantity or estimate listing; and FIG. 20 is a copy of an eighth web-page detailing the project quantity or estimate listing.

DETAILED DESCRIPTION OF THE PREFERRED EMBODIMENT

Figure 1:
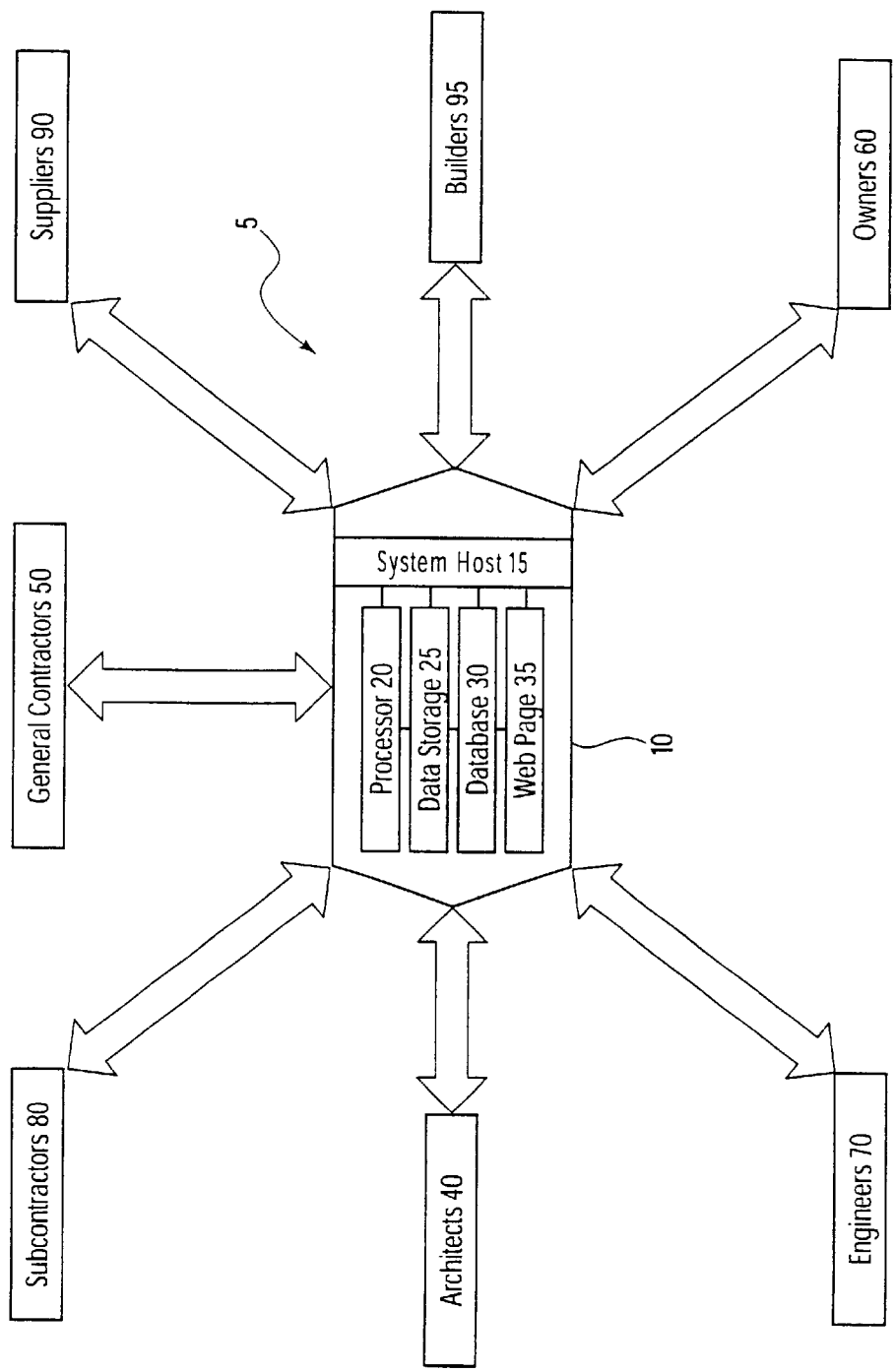
FIG. 1 schematic diagram of the system for presenting construction projects over a computer network.

FIG. 1 refers to a schematic diagram of the computer network 5 for presenting a construction project over a computer network.

In this case, there is a server 10 that is run by a system host 15 that controls a processor 20, a data storage device 25, a database 30, and a series of web-pages 35. The database is preferably stored in data storage device 25, while web-pages 35 are generated for viewing from database 30.

System host 15 runs a program that controls the process for displaying quantities, estimates, bids, project schedules, and shop drawings on construction projects stored in database 30 over the computer network. Through a series of remote computers, a series of different purchasers can log into server 10 to review these construction projects and to purchase information relating to these construction projects on web-pages 35. These purchasers could be an architect 40, a general contractor 50, a construction owner 60, a construction engineer 70, a subcontractor 80, a construction supplier 90 or a builder 95.

Figure 2:
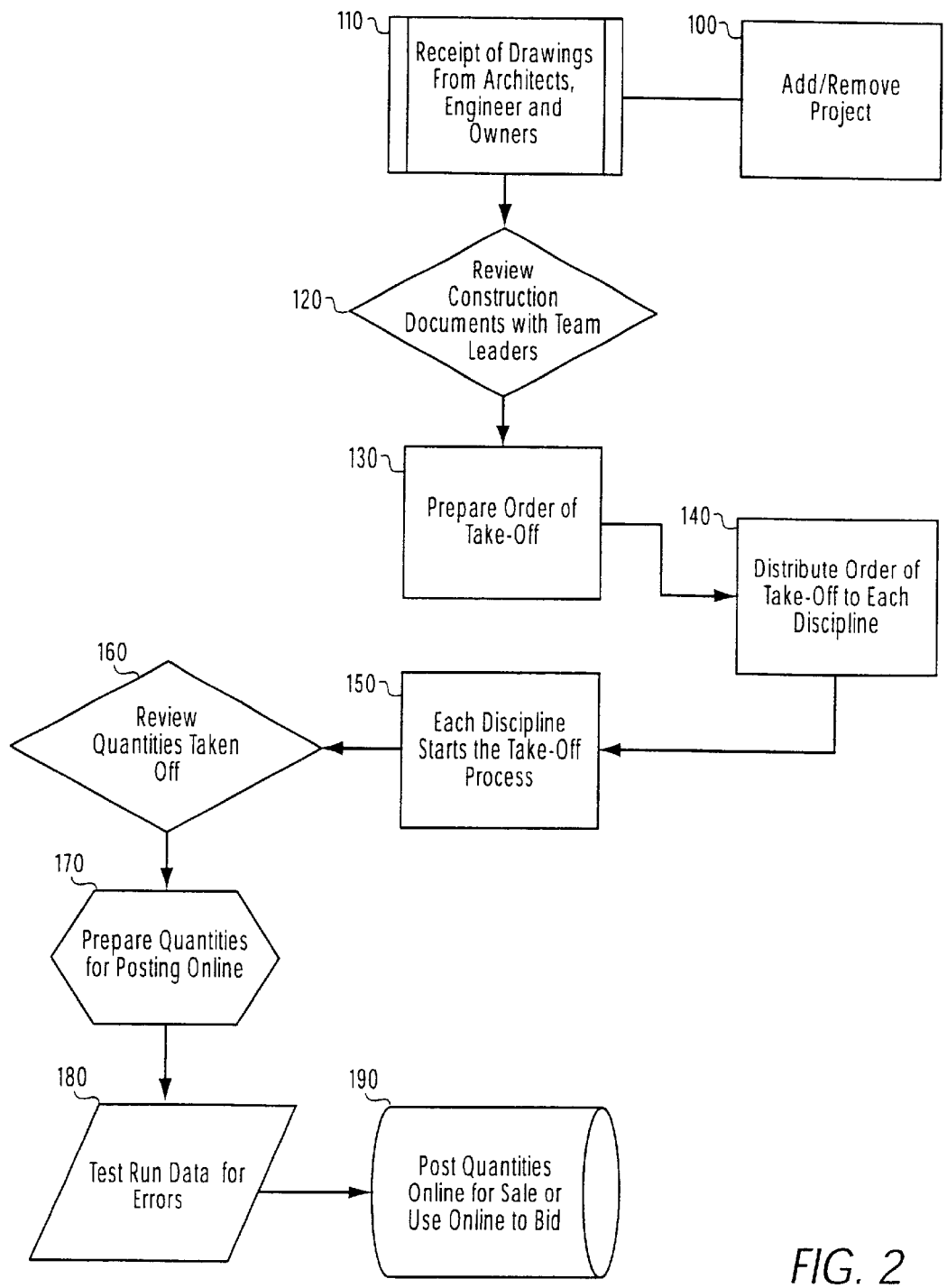
FIG. 2 is the process for importing construction information into a server on the computer network.
Figure 3:
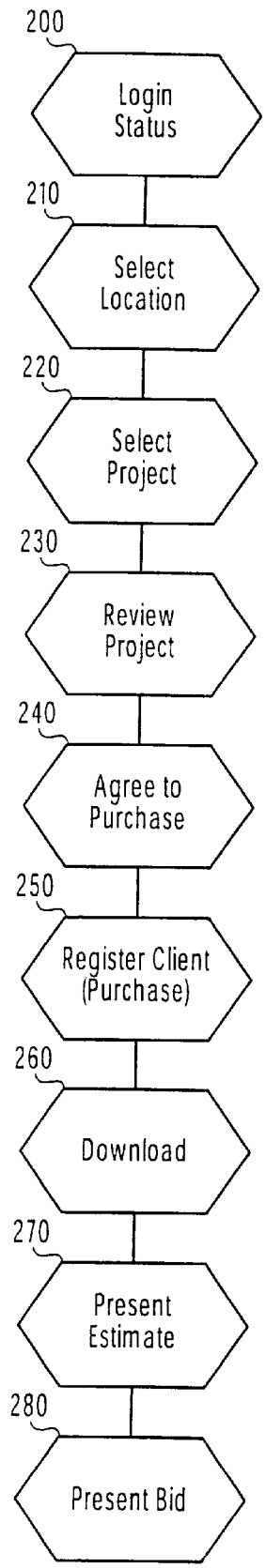
FIG. 3 is the process for presenting construction projects over the computer network.
Figure 5:
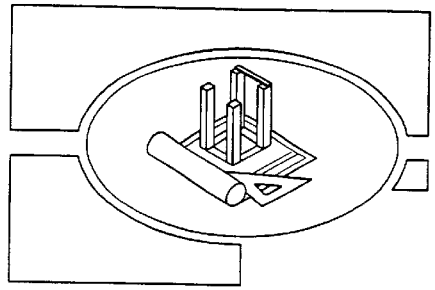
FIG. 5 is a copy of a file upload web-page for uploading files into the database.

This process is shown in greater detail in FIGS. 2 and 3. Essentially, FIG. 2 shows the process for entering information into database 30. In this case, in step 100, a project owner such as an architect 40 selects to add or remove a project. Next in step 110, the user such as an in house project co-ordinator receives information relating to a construction project in a central office that houses system host 15 via an electronic transfer, or through a regular mail service. The electronic transfer can be effected by either an electronic transfer such as electronic mail or a file upload. The user uploads this information via a web-page shown in FIG. 5. This information comes in the form of shop drawings, or project schedules. Here, in step 120, the user reviews the drawings and specifications with team leaders and enters information such as digitized sketches taken from blueprints, and a spreadsheet that contains the estimate numbers for each type of material necessary to build this construction project. Next, in step 130 the user prepares the order of the quantities to take off. Next, in step 140, the user distributes the order of the take off to each discipline. Each discipline or section is categorized and listed in FIGS. 13–20. Next, in step 150 the user starts the quantities take off process for each discipline. Here, all material quantities are taken off and listed with the associated specification section, sub-sections, and drawing number. All quantities that are taken off include an audit trail, indicating how the quantities were derived and the location in the documents where these quantities were specified. Each detail, location and specification is referenced with respect to construction documents when available or at the discretion of the team leader. In some cases, a traced drawing is included with the quantities indicating precisely what was taken off from the drawings.

Next, in step 160 a project supervisor such as a head of a division reviews the quantities taken off of the information presented. Here the project supervisor can question the user regarding the type and the amount of quantities taken off of the information presented. In this case, the estimators use a take off software such as a digitizer which allows each estimator to review the drawings and take off quantities based upon these drawings.

Next, if the supervisor accepts these quantities, then in step 170 the user prepares these quantities for posting online. After that, each specification section and subsection that has been quantified will be saved as an individual electronic spreadsheet file and posted online in that manner. Next, in step 180 the user creates a test run to determine whether the data has errors. Finally, in step 190 the user posts quantities online for sale or use online to bid.

FIG. 4 shows a web-page for allowing a member of an administrative team to enter information relating to this construction project. This information is the project name, the address of the project, including the city, state, and zip code of the project, the engineers estimated cost, the bid due date, the General Contractor's estimated project start date, the project contract number, the size of the project in square footage, and a brief description of the project.

Once this information has been entered, the administrative team can change the project information via a web-page shown in FIG. 6. FIG. 6 shows a series of fields that allows a user to update quantities, estimates or bids for each sub heading. For example, this web-page allows a member of the administrative team to enter the division number and the name of the subheading taken from one of the sixteen divisions shown in FIGS. 13–20. Next, the user can update the division cost and the project square footage for each division entered.

Figure 7:
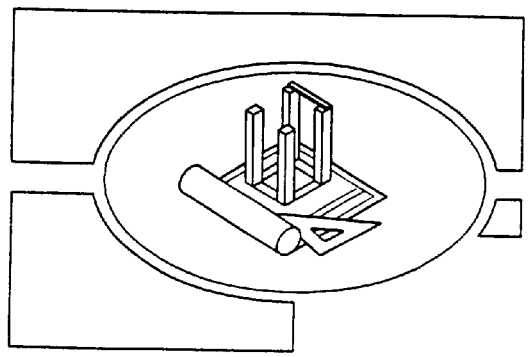
FIG. 7 is a copy of a location selection web-page for selecting construction projects based upon their location.

FIG. 3 shows the process for retrieving this information for the construction projects. This process starts with step 200 wherein a purchaser such as a contractor, subcontractor, engineer, or construction manager logs into server 10. Next, in step 210 the purchaser selects the location of the project via a web-page shown in FIG. 7. In this case, when the purchaser selects a project based upon the location of that project, system host 15 sorts each project based upon its location and then presents these project in the order of the proximity to the location that the user selected. Once this project has been selected in step 220, the purchaser can review this project in step 230 to make sure that this project is the exact project selected by the purchaser. The purchaser reviews this project via a web-page shown in FIG. 8.

Next, in step 240 the purchaser agrees to purchase this project wherein the purchaser is next directed step 250 to enter in the purchaser's purchasing information in a webpage shown in FIG. 9. Here the purchaser enters customer information such as company name, address, the user's name, telephone number, fax number, email address, the user's login id and password. In addition, the purchaser is asked to enter in his or her credit card information to purchase this item.

Next, in step 260 the purchaser downloads the information that he or she purchased. Essentially the information purchased by the user is either quantities, estimates, bids, project schedules, or shop drawings.

If in step 250 the purchaser purchased quantities from system host 15, then the purchaser could proceed to step 270 to enter estimates for the quantities downloaded by the purchaser. The purchaser has the option to either enter these estimates online and have them saved into database 30, or to send these estimates directly to the purchaser presenting the construction project online. If the purchaser presents his or her estimates online then the purchaser simply uploads this information relating to the estimates to server 10 and system host 15 saves this information in database 30.

Next, in step 280, the purchaser can also present a bid based upon these estimates so that this system creates not only an online quantity disclosure for construction projects but also an online bidding process for construction projects.

At any time during this bidding process, the user displaying the construction project information could provide cost updates to the purchasers bidding on this project. These cost updates could be in the form of a change in the price of each quantity report downloaded, or a change in the price of quantities for each division based upon the square feet of the project. The display of this cost estimate is shown in a web-page in FIG. 10.

Figure 11:
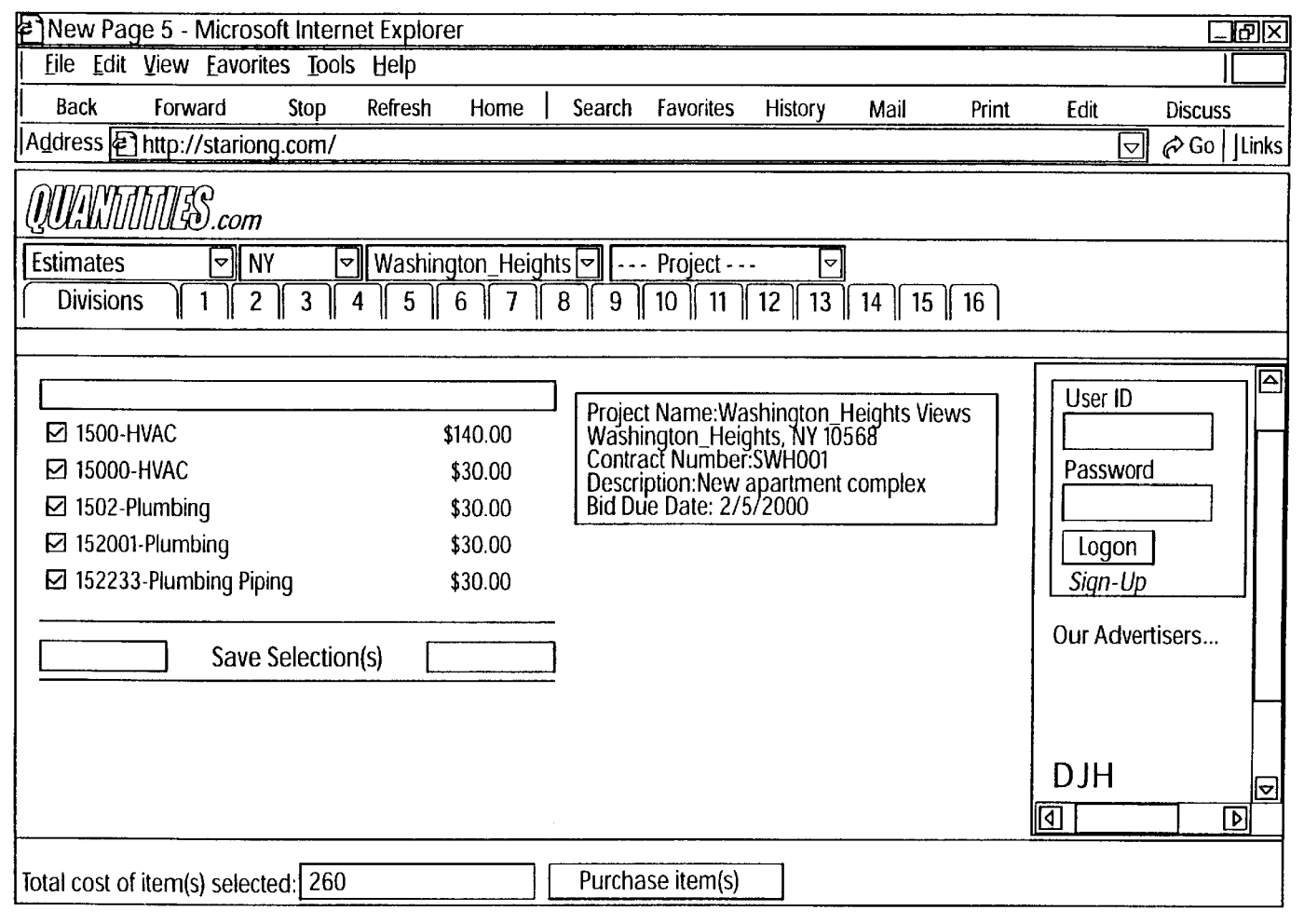

FIG. 11 shows a first embodiment of the invention showing a listing for the quantities in the sixteen different fields shown in FIGS. 13–20. In addition, on this web page there is included a listing of the quantities in a left-hand column and the corresponding estimate in the right-hand column. In this way a purchaser can simply select a check box in the left-hand column to select the quantity and the price for that quantity.

FIGS. 13–20 show the layout of a series of web-pages that list quantities. Essentially, when an architect 40 presents information relating to this project to system host 15, the architect 40 presents this information in a spreadsheet style with CSI index numbers detailing the different areas of construction. A user using system host 15 then arranges this information into a series of 16 headings that are standard for all projects. These headings are general conditions, sitework, concrete, masonry, metals, wood and plastics, thermal and moisture protection, doors and windows, finishes, specialties, equipment, furnishing, special construction, conveying systems, mechanical, and electrical. In that way, a series of purchasers connected to system host 15 can select different quantities for purchasing based upon the purchaser's selection of these divisions or headings.

Accordingly, while two embodiments of the present invention have been shown and described, it is to be understood that many changes and modifications may be made thereunto without departing from the spirit and scope of the invention as defined in the appended claims.

What is claimed is:

1. A system for presenting a plurality of quantities relating to a construction project over a computer network having a server comprising:
   a) at least one database comprising a series of tables listing information relating to a construction project;
   b) at least one data storage device for storing said at least one database;
   c) at least one processor for sorting said construction projects based upon their geographic location;
   d) a series of web pages for displaying information relating to the construction project over the computer network; and
   e) at least one digitizer to digitize at least one shop drawing and take off a plurality of quantities from said at least one shop drawing wherein said quantities are sorted and stored in said at least one database.

2. The system as in claim 1, further comprising a central office location for receiving information relating to the construction projects and entering said information into said server.

3. The system as claimed in claim 1, wherein said at least one database comprises a plurality of tables of information relating to the construction project wherein said information is stored in and presented in a spreadsheet format.

4. A process for estimating a construction project over a computer network comprising the steps of:
   a) entering information relating to a at least one construction project into an online database stored on a server;
   b) digitizing at least one shop drawing relating to said at least one construction project by creating a set of digitized points and then storing said points into said online database;
   b) creating a plurality of quantities for each of said at least one construction project based upon said digitized shop drawing;
   c) presenting said plurality of quantities for each of said at least one construction project; and
   d) allowing users to download a construction report with said plurality of quantities for subsequent bidding.

5. The process as in claim 4, further comprising the step of presenting a series of bids over the computer network based upon said plurality of quantities.

6. The process as in claim 4, wherein said step of entering information includes entering a date, a location, and a description of said series of construction projects.

7. The process as in claim 6, further comprising the step of sorting said at least one construction project based upon said location of said at least one construction project and presenting said at least one construction project over the computer network.

8. The process as in claim 4, wherein said set of creating a plurality of quantities includes creating a plurality of quantities for each of a plurality of components for each of said at least one construction project.

9. The process as in claim 8, further comprising the step of categorizing said plurality of quantities into a series of subheadings.

10. The process as in claim 8, further comprising the step of displaying over the computer network each of said plurality of quantities under said series of subheadings.

11. The process as in claim 4, wherein said step of displaying said plurality of quantities in said subheadings includes displaying said plurality of quantities under at least one of the following subheadings: general conditions, site work, concrete, masonry, metals, wood a plastics, thermal and moisture protection, doors and windows, finishes, specialties, equipment, furnishings, special construction, conveying systems, mechanical and electrical.

12. The process as in claim 4, further comprising the step of updating said information entered for said at least one construction project.

13. The process as in claim 4, further comprising the step of presenting a cost update to a purchaser so that the purchaser knows an estimate rate on each project.

14. The process as in claim 4, further comprising the steps of presenting at least one shop drawing and at least one project schedule associated with said at least one construction project over the computer network.

15. An article of manufacture comprising:
   a) a computer usable medium having a machine readable program code means for entering information relating to a series of construction projects into an online database stored on a server;
   b) a machine readable program code means for reading in a series of digitized points based upon at least one shop drawing to create a digitized shop drawing;
   b) a machine readable program code means for creating a plurality of quantities for each of said at least one construction projects wherein said plurality of quantities are taken from said at least one shop drawing;
   c) a machine readable program code means for presenting said series of quantities for each of said series of construction projects; and
   d) a machine readable program code means for allowing users to download said construction report with said plurality of quantities for subsequent bidding.

* * * * *